May 21, 1946.   C. W. HANSELL ET AL   2,400,822
PULSE GENERATOR
Filed March 16, 1938
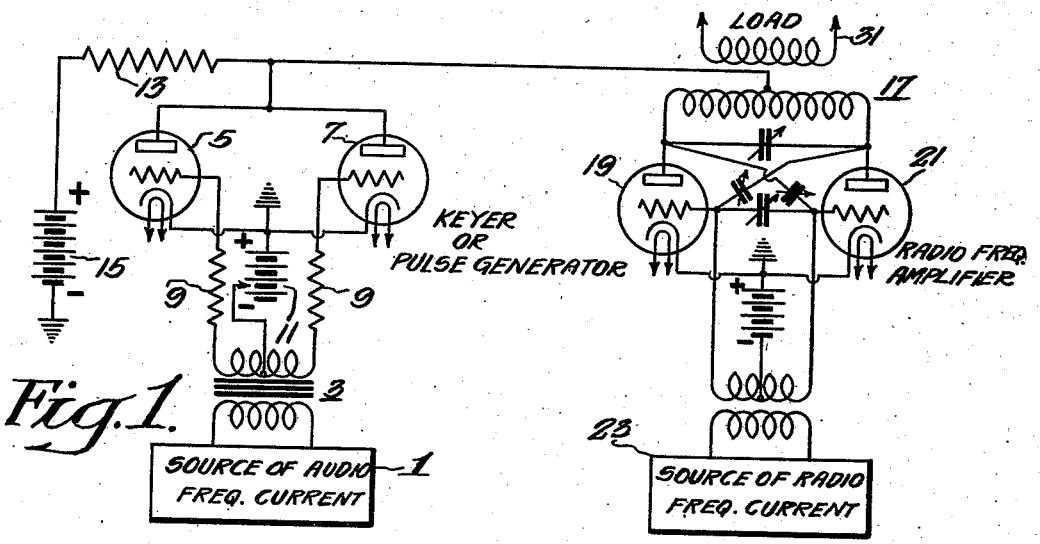
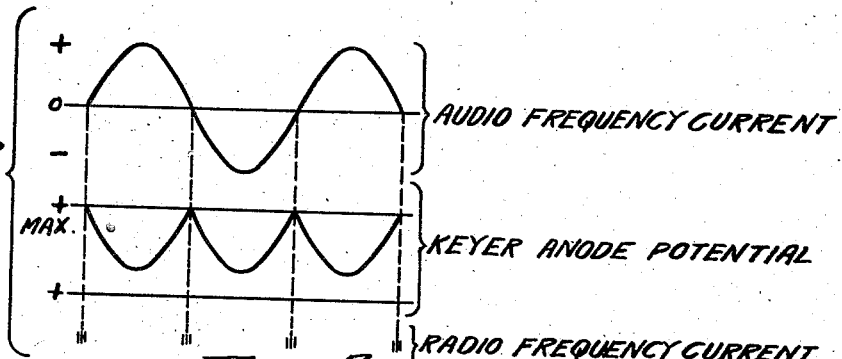
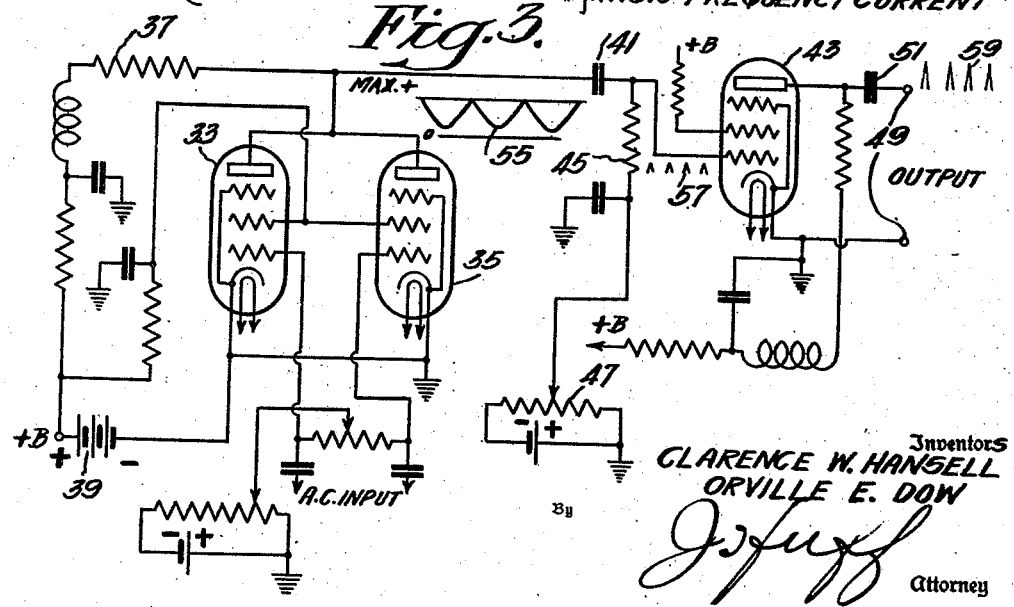
Inventors
CLARENCE W. HANSELL
ORVILLE E. DOW
Attorney Patented May 21, 1946

2,400,822

UNITED STATES PATENT OFFICE 2,400,822

PULSE GENERATOR

Clarence W. Hansell and Orville E. Dow, Port Jefferson, N. Y., assignors to Radio Corporation of America, a corporation of Delaware Application March 16, 1938, Serial No. 196,125

10 Claims. (Cl. 250—27)

Our invention relates to pulse generators, and more particularly to pulse generators in which the pulses are accurately and uniformly spaced, and in which the pulse duration is very brief compared with the interval between successive pulses.

We are aware of prior art pulse generators in which the peaks of a current saw-tooth wave form have been selected, and of pulse generators in which the maximum portions of the positive or negative swings of an alternating current have been used. The former type is not always satisfactory because a saw-tooth generator does not always produce a uniform wave and hence irregular pulses may be generated at irregular intervals. The latter type is apt to be unsatisfactory because the peaks of sine wave currents occur when the wave is changing most gradually, and therefore the lengths of the selected peaks cannot be accurately chosen nor can they be made very short without their being subject to length variations unless extreme precautions are taken to hold all conditions and adjustments constant.

As one of the objects of our invention, we contemplate a pulse generator in which the pulses are determined by the zero, or near zero, of the alternating current wave instead of the peaks. In a pulse generator in which the pulses correspond to the conditions of nearly zero current of a sine wave of constant frequency, the pulses will not only be accurately spaced but of very brief duration compared with the intervals between the successive pulses.

One of the objects of our invention is to provide means for generating pulses.

Another object is to provide means for generating very sharp pulses at substantially uniform intervals.

Another object is to provide means for relating the generation of pulses to the zero potential moments of a sine wave current.

A further object is to provide means for generating current pulses of very short duration in comparison with the intervals between pulses and fixedly related to the phase of a sine wave current.

In describing our invention, reference will be made to the accompanying drawing, in which Figure 1 is a schematic circuit diagram of one embodiment of the invention;

Figure 2 is an illustration of the wave form of the generated currents; and

Figure 3 is a diagram representing a modified embodiment of the invention.

It should be understood that the circuits illustrated are chosen by way of example, and that modifications may be made within the scope of the invention.

Referring to Fig. 1, a source 1 of alternating current, usually of audio frequency, preferably of constant frequency, is connected through a transformer 3 to the input circuits of a pair of thermionic tubes 5, 7. The grid electrodes of the tubes are connected through limiting resistors 9 to the terminals of the secondary of the transformer. The cathodes are connected together, to ground, and to the positive terminal of a grid biasing source, represented by battery 11. The negative terminal of the battery 11 is connected to a point intermediate the ends of the secondary terminals of the transformer. The anodes of the tubes 5, 7 are connected together and, through a resistor or impedance 13, to the positive terminal of a B-battery 15, or other source of anode current. The negative terminal of the B-battery 15 is grounded.

The junction of the impedance 13 and anodes of the tubes 5, 7 is connected to the mid-point of an output transformer 17, which is connected to the anodes of a pair of radio frequency amplifier tubes 19, 21. The input circuits of the amplifier tubes 19, 21 are connected in push-pull relation to a source 23 of radio frequency current. The input circuit is grounded and may include means for biasing the grids of the amplifiers.

The pulse generator tubes 5, 7 and circuits connected thereto form the pulse generator or keyer; the amplifier tubes 19, 21 and associated circuits represent the device to be keyed by the generated pulses. The operation of the pulse generator will be described by reference to Figs. 1 and 2. The audio frequency currents 25 are applied in push-pull relation to the grid-cathode or input circuit of the pulse generator tubes 5, 7. The grids are biased negatively with respect to cathode so that no current will flow in the anode circuit when no audio frequency potential is applied to the grids. Alternately, the grids are biased positively by the potential from the audio frequency current source. Thus currents will flow in the anode circuit of the tube biased positively. Because of the push-pull input connection, anode current will alternately flow in the pulse generator tubes 5 and 7, except during very brief and uniformly spaced moments when the audio frequency current wave form passes through zero. During these instants the voltage drop in the impedance 13 will be a minimum, due to no current flowing in either of the tubes 5 and 7, and the maximum voltage 27 of the B source 15 will be applied to the anodes of the radio frequency amplifier tubes 19, 21. When the maximum voltage is applied, the radio frequency amplifier becomes operative, and during this brief instant passes a pulse 29 of radio frequency energy to the load circuit 31. For the condition already described, the battery 11 has such a potential that tubes 5 and 7 are just biased to cut-off with no audio frequency potential applied to the grids. This is the condition for the shortest duration of the pulses for any particular audio frequency input. If the bias battery potential is increased slightly above this value, the duration of the pulse will be increased while the period of the pulses will remain unchanged.

By way of example, the pulse duration may be made as short as 1% of the time of a half cycle. If the applied audio frequency varies at 1000 cycles per second, the pulse duration will equal .000005 second, or 5 microseconds. It should be understood that the pulse duration may be shortened by increasing the frequency of the applied pulse. Another method of shortening the pulse length is disclosed in the copending application Serial No. 182,418, filed December 30, 1937, by Irving Wolff.

In some applications of the invention, it is desirable to shape the wave form of the pulse currents. A suitable pulse generator and pulse shaper are shown schematically in Fig. 3. The inputs of the pulse generator tubes 33, 35 are connected to an alternating current source (not shown). The outputs of the tubes 33, 35 are connected in parallel and to a resistor 37 which is connected through an inductance 38 and a suitable filter to an anode current source 39. The purpose of the inductance is to compensate for the tube and circuit capacities as is the practice with wide band or video amplifiers. Screen grids and suppressor grids are connected in the conventional manner. The pulse generator tubes are biased as previously described. The junction of resistor or inductor 37 and the anodes of tubes 33, 35 is coupled through a coupling capacitor 41 to the control grid of wave shaping tube 43. The grid is biased negatively by connecting a resistor 45 between the grid and a suitable bias voltage source 47. The anode circuit of the wave shaping tube 43 includes the B source 39 and suitable resistor, inductance and filter. The output circuit 49 is connected between the cathode and the anode of tube 43 and preferably includes a coupling capacitor 51.

The operation of the pulse generator tubes 33, 35 is essentially the same as previously described in connection with Fig. 1. The wave shaper tube 43 is biased so that it is effective only when the maximum pulse voltages 55, which are positive, overcome the steady negative bias 47. Thus positive pulses 57 (or pulses less negative than the grid potential required for cut-off) are applied to the input of the wave shaping tube 43. The input pulses 57 establish output currents which appear as pulses 59 in the output of the wave shaping tube.

Thus our invention is described as a pulse generator which operates by applying potentials from an audio frequency source to the input of a pair of pulse generator tubes which are biased to cut-off during the brief moment when the applied A.-C. potentials are zero. The anodes of the pulse generator tubes, being fed through a resistor, rapidly increase in potential for the instant of zero applied input current. This rapid rise in potential is applied to key an amplifier, a wave shaping tube or the like.

Although we have shown resistances 13 and 37, in Figs. 1 and 3, associated with the pulse generator tubes 5, 7 and 33, 35, it should be understood that the resistances may be replaced by inductive reactances of correct value. The use of reactance tends to hold constant current from the power supply source and increases the power efficiency of the whole system by eliminating the power loss in the resistors. It also makes possible the use of smaller pulse generator tubes. An objection to the use of inductance is that it can give rise to excessive potentials if for any reason the current through it is accidentally abruptly interrupted. However, this condition can be avoided by shunting the inductance with a piece of Thyrite lightning arrester material, not shown in the drawing. Although we have shown batteries as sources of power in the figures, it will be understood that, in practice, we prefer to use rectifiers or battery eliminators for power sources in most cases.

We claim as our invention:

1. A pulse generator including in combination a pair of pulse generator tubes having input and output circuits, means for connecting said input circuit in push-pull relation to a source of alternating current, means for connecting said output circuit through a common impedance to an anode current source, said common impedance presenting an impedance sufficient to produce a large anode potential drop in response to the flow of anode current from said source, means for applying a steady bias which together with said alternating current so biases said input circuit that anode current flows through said impedance throughout the cycle of said alternating current except during zero potential, and means for utilizing said anode source during said zero potential only.

2. A pulse generator including in combination a pair of thermionic tubes having input and output circuits, a source of alternating current, said input circuit being connected in push-pull relation to said source of alternating current, an impedance, a source of anode current, said output circuit being connected through said impedance to said source of anode current, said impedance presenting an impedance sufficient to produce a large anode potential drop in response to the flow of anode current from said source, and means for biasing said tubes so that current flows through said impedance except during moments when said alternating current passes through zero potential, and means for applying said anode current to a load circuit during said moments only.

3. A pulse generator including in combination a pair of thermionic tubes each having a grid, cathode and anode electrodes, means for impressing in push-pull relation alternating currents on said grid electrodes, a source of anode current, an impedance for applying said anode current to said cathode and anode electrodes in parallel relation, said impedance presenting an impedance sufficient to produce a large anode potential drop in response to the flow of anode current from said source, means for applying a steady bias between said cathode and grid electrodes whereby anode current is cut off when zero potentials are applied to said grids, and a connection to said anodes for deriving therefrom current pulses, during the instants of said zero potential only.

4. In a device of the character of claim 3, a wave shaping tube effectively connected to said last-mentioned connection for passing only the maximum positive pulses of said pulse generator.

5. A pulse generator including a pair of thermionic tubes having input and output circuits, said input circuit being arranged in push-pull relation for application of alternating currents, a source of anode current, an impedance serially connecting said source and said output circuit, a bias voltage for said input circuit, said bias permitting anode current to flow in said impedance and output circuit except during the instants of zero of applied alternating current, a wave shaping tube having an input circuit effectively connected to said impedance to derive therefrom a positive voltage during said instants, and an output circuit across which pulse currents are established, and means for biasing said wave shaping tube input circuit negatively so that pulse currents are only established during said instants at which said positive voltage is applied.

6. The method of generating pulses which comprises causing a current to flow through an impedance of a value sufficient to produce a substantial anode voltage drop in response to the application of said current, causing said current to vary in synchronism with an alternating current during the maximum portion of both negative and positive waves of said alternating current, and interrupting the flow of said current through said impedance during the instants when said alternating current passes through zero.

7. The method of generating pulses which comprises causing a direct current to flow through an impedance of a value sufficient to produce a substantial anode voltage drop in response to the application of said current, varying the flow of said direct current through said impedance in synchronism with an alternating potential, interrupting the direct current flowing in said impedance at the instants when said alternating potential passes through zero.

8. The method described in claim 7 including an additional step of shaping the wave form of the potential drop across said impedance.

9. A pulse generator including in combination a pair of pulse generator tubes having input and output circuits, means for connecting said input circuits in push-pull relation to a source of alternating current, means for connecting said output circuit through a common impedance to an anode current source, said common impedance presenting an impedance sufficient to produce a large anode potential drop in response to the flow of anode current from said source, and means for biasing said input circuit so that anode current flows through said impedance throughout the cycle of said alternating current except during a short interval about zero potential, the length of said interval being controlled by said bias.

10. In a device of the character of claim 1, a source of radio frequency current, a radio frequency amplifier having an input circuit including said source of radio frequency current and an output circuit, means for biasing said amplifier input circuit to prevent the passage of said radio frequency current, said amplifier output circuit being energized by a connection including said common impedance and said anode current source to derive therefrom positive pulses at said zero potential instants, said positive pulses exceeding the effect of said biasing means on said amplifier output circuit and thereby causing anode current to flow in said radio frequency amplifier during said zero potential instants, whereby said amplifier passes pulses of radio frequency energy during said zero potential instants.

CLARENCE W. HANSELL.
ORVILLE E. DOW.